F. C. CRAW.
SPEED REGULATING AND BRAKE MECHANISM.
APPLICATION FILED APR. 13, 1905. RENEWED AUG. 29, 1907.

928,182.

Patented July 13, 1909.
4 SHEETS—SHEET 3.

WITNESSES:
H. A. Lamb.
S. W. Atherton.

INVENTOR
Frank C. Craw
BY
A. M. Wooster
ATTORNEY

F. C. CRAW.
SPEED REGULATING AND BRAKE MECHANISM.
APPLICATION FILED APR. 13, 1905. RENEWED AUG. 29, 1907.

928,182.

Patented July 13, 1909.
4 SHEETS—SHEET 4.

WITNESSES:
H. A. Lamb
S. W. Atherton

INVENTOR
Frank C. Craw
BY
A. W. Wooster
ATTORNEY

UNITED STATES PATENT OFFICE.

FRANK C. CRAW, OF SOUTH NORWALK, CONNECTICUT, ASSIGNOR OF ONE-HALF TO FRANKLIN M. RAYMOND, OF SAUGATUCK, CONNECTICUT.

SPEED-REGULATING AND BRAKE MECHANISM.

No. 928,182.     Specification of Letters Patent.     Patented July 13, 1909.

Application filed April 13, 1905, Serial No. 255,317. Renewed August 29, 1907. Serial No. 390,643.

*To all whom it may concern:*

Be it known that I, FRANK C. CRAW, a citizen of the United States, residing at South Norwalk, county of Fairfield, State of Connecticut, have invented a new and useful Speed-Regulating and Brake Mechanism, of which the following is a specification.

My invention has for its object to produce speed regulating and brake mechanism especially adapted for use in connection with explosive engines, as upon motor vehicles.

It is one of the objects of this invention to produce a mechanism that can be applied to any engine or power shaft, which will enable the operator to start, increase speed, slow up, stop or reverse a driving shaft, which may be suitably connected up as to the wheel shaft of a motor vehicle, without in any way affecting the speed or power of the engine or power shaft.

A further object of the invention is to produce speed regulating mechanism which shall have direct and positive connection with the power shaft, thus avoiding the use of the usual clutch and change speed gearing.

A further object of the invention is to produce speed regulating mechanism in which the transmission of power shall be accomplished by eccentrics and without the use of cranks or gearing, the changes in speed being gradual and without shock or blow both in hill climbing and on a level road.

A further object of the invention is to produce speed regulating mechanism in which adjustable eccentrics and their carrying disks shall serve as a fly wheel, thereby greatly lessening the weight and the space required, as no fly wheel is required upon the engine.

A further object of the invention is to produce speed regulating mechanism having a balance wheel consisting of adjustable eccentrics and their carrying disks in which the center of gravity of the eccentrics will be shifted outward or inward relative to the center of rotation of the said balance wheel as the speed in either direction is increased or diminished, thereby imparting to the said balance wheel greater momentum as the speed is increased and reduced momentum as the speed is diminished.

A further object of the invention is to produce speed regulating mechanism which will itself perform the functions of brake mechanism, thus rendering unnecessary the brake mechanisms now required upon motor vehicles, and giving the operator perfect control of a motor vehicle at all times, an especially important feature in hill climbing or descending.

A further object of the invention is to produce speed regulating mechanism which can be wholly controlled by a single rock shaft which may be operated by the foot.

A further object of the invention is to produce speed regulating mechanism which is wholly independent of the engine, requires no clutch connection therewith and will enable the operator to transmit to the driving shaft any required speed in either direction without any interference whatever with or adjustment of the engine, adjustment of the sparking mechanism or change in the fuel supply and without the slightest shock to the engine.

With these and other objects in view the invention consists in certain constructions and in certain parts, improvements and combinations which will be hereinafter described and then specifically pointed out in the claims hereunto appended:

In the accompanying drawings forming a part of this specification, in which like characters of reference indicate the same parts.

It should be understood that the position in which my novel speed regulating mechanism is placed is wholly unimportant so far as the principle of the invention is concerned, and that the mechanism may be placed in any position best adapted to the special use to which it is to be applied.

In the drawings I have illustrated the mechanism as resting upon a floor in substantially the position it would occupy when used in a power launch or in a machine shop. When applied to a motor carriage, which is the use I shall refer to for the purposes of this specification, it would be suspended from above and would be under the body of the vehicle, the rock shaft and foot lever only being above the floor of the body.

In use, in whatever position it may be placed, the mechanism is inclosed in a suitable case, not shown in the drawings, and runs in a bath of oil.

10 denotes the engine or power shaft shown as journaled in boxes 11 upon standards 12 which may either rest upon a suitable support, as indicated in the drawings, or be suspended from above.

13 denotes the driving shaft which is connected to the power shaft by the novel speed regulating and brake mechanism which I am about to describe. The driving shaft is journaled in boxes 14 upon standards 15 which may either rest upon a suitable support, as indicated in the drawings, or be suspended from above.

16 denotes sprocket wheels upon the driving shaft from which a sprocket chain, not shown, extends to the shaft to be driven, for example, the wheel shaft of a motor vehicle.

The vitally important feature of the invention is that eccentrics carried by the power shaft may be so adjusted as to impart movement in either direction to the driving shaft by means of clutches which grasp and release the driving shaft alternately, thus keeping it under perfect control at all times either in driving or reversing or holding it stationary if required. The power shaft is provided with an enlargement 17 having a transverse recess 18 the purpose of which will presently be explained.

Figure 2:
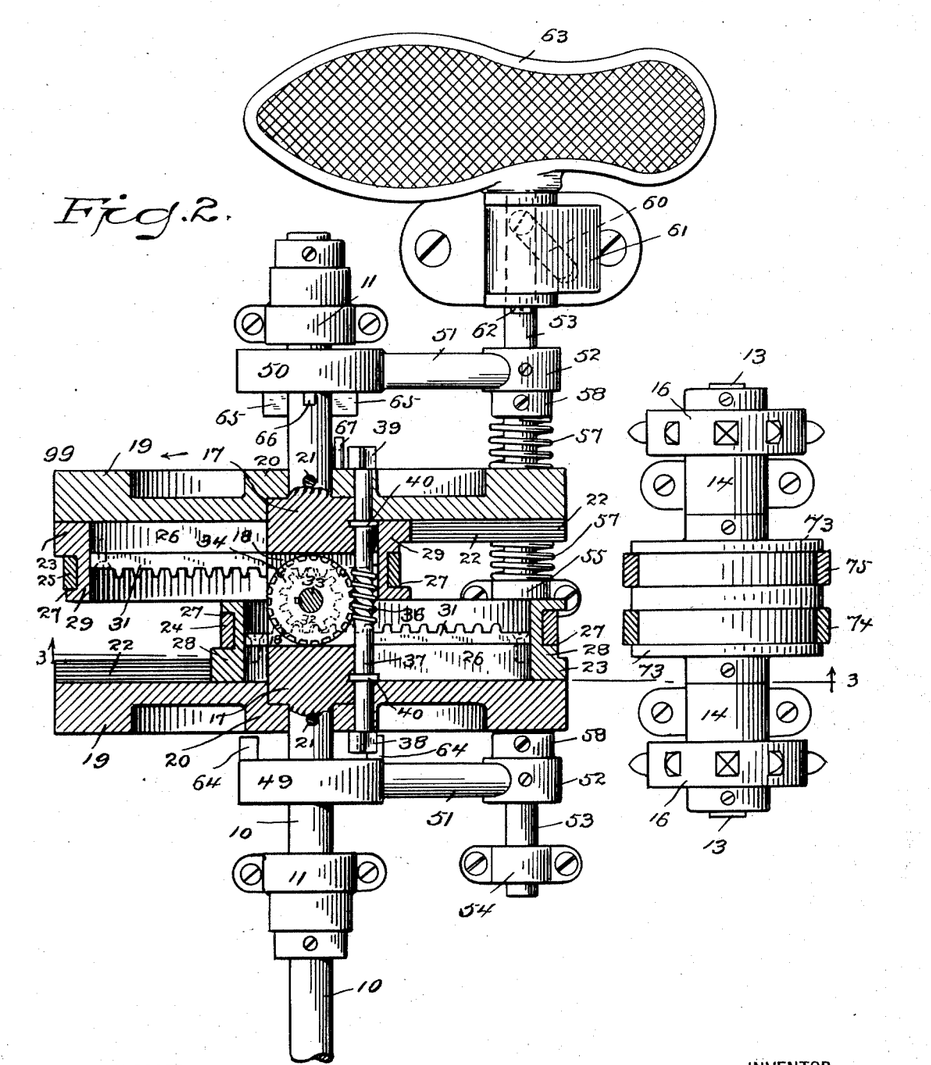
Fig. 2 a similar view on the line 1—2 in Fig. 4, the eccentrics being in operative position and adjusted at their farthest throw to give the greatest possible forward speed to the driving shaft.
Figure 3:
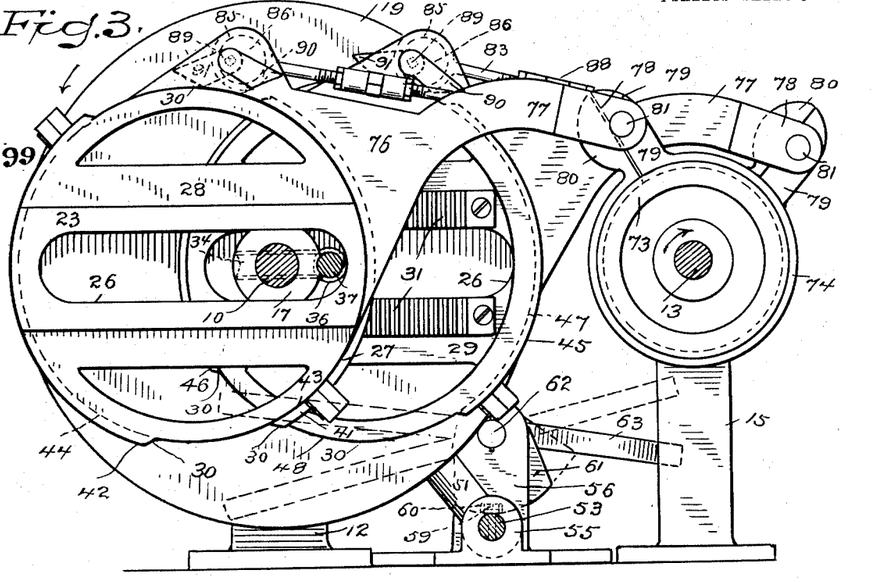
Fig. 3 a section of the parts on the line 3—3 in Fig. 2, the eccentrics being in operative position and adjusted at their farthest throw to give the greatest possible reverse speed to the driving shaft.
Figure 4:
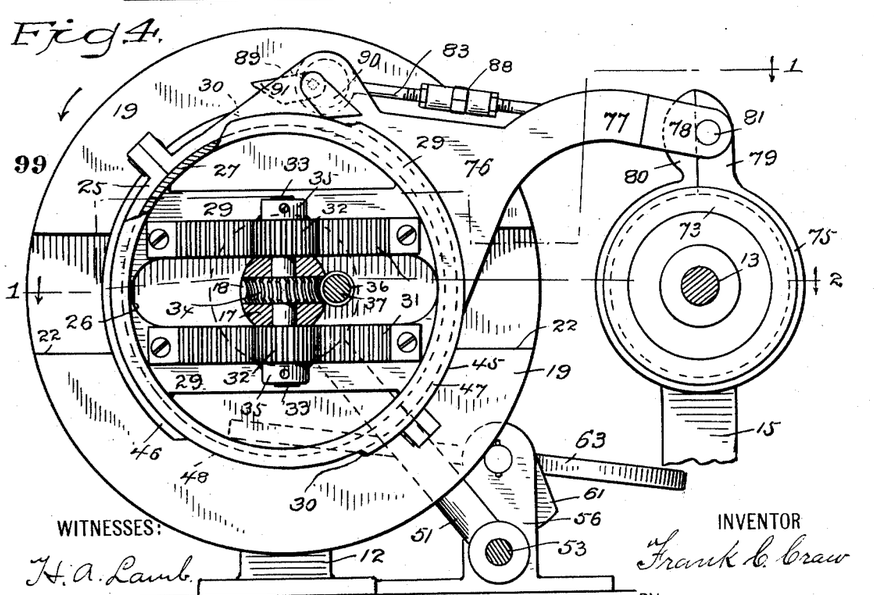
Fig. 4 a section on the line 4—4 in Fig. 1, the eccentrics being in the inoperative position and the driving shaft at rest, as in Fig. 1.

19 denotes carrying disks shown as provided with hubs 20 and rigidly secured to the power shaft as by means of pins 21. The inner faces of these disks are provided with ways 22 which receive slides 23 upon the eccentrics which are indicated respectively by 28 and 29. Each eccentric and slide is provided with a slot 26 through which the power shaft passes freely, as clearly shown in Fig. 3. The peripheries of the eccentrics are provided with grooves 27 to receive eccentric straps indicated respectively by 24 and 25. Each eccentric is provided on opposite sides of the groove with a raised and a depressed peripheral surface, said surfaces merging into each other by means of inclines 30. The raised surfaces on eccentric 28 are indicated respectively by 41 and 42 and the depressed surfaces are indicated respectively by 43 and 44, raised peripheral surface 41 lying on the opposite side of the groove from depressed peripheral surface 43 and raised surface 42 lying on the opposite side of the groove from depressed surface 44. The raised surfaces on eccentric 29 are indicated respectively by 45 and 46 and the depressed surfaces are indicated respectively by 47 and 48, raised peripheral surface 45 lying on the opposite side of the groove from depressed peripheral surface 47, and raised surface 46 lying on the opposite side of the groove from depressed surface 48, as clearly shown in Figs. 3 and 4 which see in connection with Figs. 1 and 2. It should be noted furthermore, and will be clearly understood from Fig. 3, that the respective raised and depressed surfaces are transposed on the two eccentrics; that is to say, as seen in Fig. 3, the depressed surface on the right hand side of eccentric 28 is nearest the point of view and the raised surface farthest from the point of view, and on eccentric 29 the raised surface at the right is nearest the point of view and the depressed surface farthest therefrom. The functions of the raised and depressed surfaces and the reasons for the special arrangement just referred to will presently be described in full.

Each eccentric is provided on its inner face on opposite sides of the slot 26 with racks 31 which are engaged by pinions 32 carried by a shaft 33 which extends transversely through the enlargement of the power shaft. Shaft 33 is retained in place by means of a worm gear 34 which is keyed or otherwise rigidly secured thereto. The pinions are shown as provided with hubs 35 which are secured to the ends of the shaft by means of set screws, see Fig. 4. Worm gear 34 is operatively engaged by a worm 36 on a shaft 37 which is journaled in disks 19 and is provided at its ends with star wheels 38 and 39 which lie on the outer sides of the hubs of the disks. The worm shaft is shown as additionally held against longitudinal displacement by means of circumferential ribs 40 which engage corresponding grooves in the enlargement of the power shaft. The worm shaft is actuated by a star wheel 38 to increase the speed of the driving shaft and by means of star wheel 39 to decrease the speed and to reverse the rotation of the driving shaft by mechanism which I will now explain.

49 and 50 denote collars which are adapted to slide on the power shaft and are connected by means of arms 51 with collars 52 which are rigidly secured as by means of set screws to a longitudinally movable rod 53 which is mounted to slide freely in standards 54, 55 and 56.

57 denotes coil springs surrounding rod 53 the ends of which bear respectively against the opposite sides of bearing 55 and against collars 58 which are rigidly secured to the rod as by means of set screws. The normal action of these springs is to retain rod 53 at its normal position with the eccentrics in their inoperative position as in Fig. 1. The tension of the springs may be adjusted at any time by shifting collars 58 on the rod, said collars being wholly independent of collars 52 from which arms 51 extend. Rod 53 is provided on its upper side with a roller 59 journaled on a pin extending from the rod. This roller engages an oblique groove 60 in a cam 61 carried by a rock shaft 62 which is mounted to oscillate in standard 56.

Figures 8, 9:
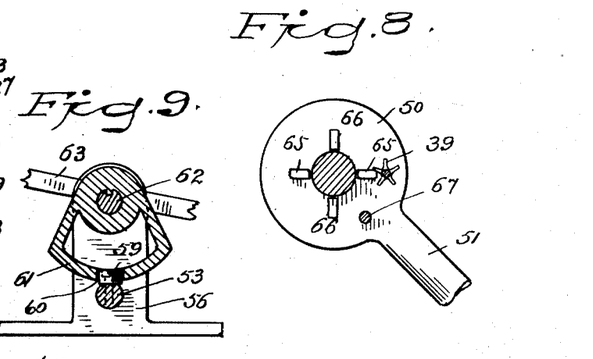
Fig. 8 a detail sectional view on the line 8—8 in Fig. 7, the position being shifted slightly to show the engagement of one of the star wheels with the lugs on the corresponding sliding collar.
Fig. 9 a detail sectional view on the line 9—9 in Fig. 1, showing the foot lever and cam in their normal position.
Figure 10:
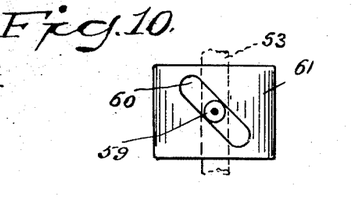
Fig. 10 is an inverted plan view corresponding to Fig. 9, showing the roller in the cam slot.

63 denotes an operating lever upon the rock shaft, in the present instance a foot lever, although it is obvious that a hand lever may be attached to the rock shaft if preferred. In the present instance I have shown the normal position of the foot lever as slightly tilted as in Fig. 9, the toe end of the lever being slightly higher than the heel end, in which position it is retained by the springs 57, these springs being strong enough to return rod 53 to its normal position, returning the foot lever to its normal position through the engagement of the roller with the cam groove as soon as pressure in either direction upon the foot lever is relieved.

Sliding collar 49 upon the power shaft is provided on its inner face with lugs 64 which are adapted to be engaged by the wings of star wheel 38 on the outer side thereof, that is on the side away from the power shaft, whereby rotary movement is imparted in one direction to the worm shaft and worm. As already stated, the movement imparted to the worm shaft by means of star wheel 38 increases the speed of the driving shaft by moving the eccentrics outward toward the position shown in Fig. 2.

Sliding collar 50 upon the power shaft is provided on its inner face with lugs 65 and between lugs 65 with shorter lugs 66, one only of which is shown in the drawings. Lugs 65 are adapted to be engaged by the wings of star wheel 39 on the inner side thereof, that is on the side toward the power shaft, whereby rotary movement is imparted to the worm shaft and worm in the opposite direction from that imparted to it through the engagement of star wheel 38 with lugs 64 on collar 49. The movement imparted to the worm shaft by means of star wheel 39 and lugs 65 decreases the speed of the driving shaft by moving the eccentrics inward from the position shown in Fig. 2. When the eccentrics are moved inward from this position, the speed of the driving shaft will be decreased until they reach the position shown in Fig. 1, at which point no movement is imparted to the driving shaft. Should this movement of the eccentrics be continued and they be moved from the position shown in Fig. 1 toward the position shown in Fig. 3, reverse movement will be imparted to the driving shaft in a manner presently to be fully explained, the reverse speed depending upon the distance outward to which the eccentrics are moved, that is upon the throw of the eccentrics the same as in driving. It will be noted in Fig. 3 that the position of the eccentrics has been reversed and that the edges of said eccentrics which were farthest from the driving shaft in Fig. 2 are nearest to the driving shaft in Fig. 3, and that the edges that were nearest to the driving shaft in Fig. 2 are the farthest therefrom in Fig. 3.

Lugs 66 upon sliding collar 50 are only brought into use in the case of an emergency. Under ordinary circumstances, when it is desired to decrease the speed of the driving shaft, the rock shaft is only tilted far enough by moving the heel end of the foot lever downward to place lugs 65 in position to be engaged by star wheel 39. Should it be required however to reverse the movement of the driving shaft instantly, a further downward movement of the heel end of the foot lever will move sliding collar 50 still farther inward toward the contiguous carrying disk 19 and will place lugs 66 as well as lugs 65 in position to be engaged by star wheel 39 so that the star wheel and worm shaft will be actuated in the reversing direction twice as fast as when lugs 65 only are engaged by the star wheel, thereby causing the driving shaft to be actuated in the reverse direction instantly and with the full power of the engine.

67 denotes pins lying loosely in corresponding holes in disks 19 and hubs 20 and the bases of which are adapted to pass into grooves 68 in the rear faces of the eccentrics, that is the faces of the eccentrics lying contiguous to the disks. The inner end of the groove in eccentric 29 and the outer end of the groove in eccentric 28 terminate in an incline 69. When the eccentrics are moved to their greatest throw in driving, as in Fig. 2, the pin corresponding with eccentric 28 will ride up the incline 69 at the outer end of the slot in said eccentric and upon the outer face of said eccentric, the effect of which is to force said pin into engagement with sliding collar 49 and force said collar outward away from the disk, the movement being far enough to just carry the lugs upon said collar out of engagement with star wheel 38. When the eccentrics are moved to their greatest throw in reversing, as in Fig. 3, the pin corresponding with eccentric 29 will ride up the incline 69 at the inner end of the slot in said eccentric and upon the outer face of said eccentric, the effect of which is to force said pin into engagement with sliding collar 50 and force said collar outward away from the disk carrying the lugs upon said collar out of engagement with star wheel 39. Suppose the eccentrics to be at their mid or inoperative position as in Fig. 1, and that it is desired to start the driving shaft forward. The toe end of the foot lever is pressed downward until sufficient speed is attained, then the pressure is relieved and springs 57 act to return the sliding collars, rod 53 and the foot lever to their normal position. Suppose however that the operator does not relieve the pressure upon the foot lever; sliding collar 49 will be retained in such a position that lugs 64 thereon will be engaged by star wheel 38 and the worm shaft will continue to be rotated. The effect will necessarily be to throw the eccentrics outward as in Fig. 2 until the pin 67 acting in connection with eccentric 28 will ride up the incline 69 of the groove 68 therein and engage sliding collar 49 on the power shaft and move it outward far enough to place the lugs thereon out of engagement with star wheel 38, thus preventing any possible damage to any of the parts even should the operator press the toe end of the foot lever downward as far as the cam slot will permit and retain it there. The only effect will be that the power shaft will be driven at the highest speed until the foot lever is tilted in the opposite direction, that is the heel end pressed downward, and sliding collar 50 moved to a position that will place the lugs thereon in position to be engaged by star wheel 39. Should the operator desire to reverse and hold the heel end of the foot lever pressed down, the eccentrics will be thrown to the position shown in Fig. 3 and the incline 69 at the inner end of eccentric 29, which was inoperative when the eccentrics were thrown to the driving position, will now become operative to move the corresponding pin 67 outward, causing it to engage sliding collar 50 on the power shaft and move it outward far enough to place the lugs thereon out of engagement with star wheel 39.

In addition to the functions already described, the carrying disks and eccentrics serve as a balance wheel for the engine and dispense entirely with the use of an ordinary balance wheel. This balance wheel formed by the carrying disks and eccentrics and which I have indicated by 99, has moreover a varying momentum which is dependent upon the speed imparted to the driving shaft and varies with the speed of the driving shaft.

As already explained, the speed imparted to the driving shaft depends upon the throw of the eccentrics; that is to say, the farther outward from the power shaft the greater diameter of the eccentrics is moved, the greater will be the speed imparted to the driving shaft and the greater will be the momentum of the balance wheel, i. e. the carrying disks and eccentrics, owing to the shifting of the center of gravity of the eccentrics outward in opposite directions from the power shaft. Outward movement therefore of the eccentrics to increase the speed of the driving shaft in either driving or reversing will correspondingly increase the momentum of the balance wheel, and inward movement of the eccentrics to decrease the speed of the driving shaft in either driving or reversing will decrease the momentum of the balance wheel, which will be least when the eccentrics are at their mid or inoperative position, as in Fig. 1, and no movement whatever is imparted to the driving shaft.

I will now describe the mechanism by which the power shaft is driven in either direction or held stationary. Driving shaft 13 is shown as journaled in boxes 14 upon standards 15. This shaft carries sprocket wheels 16 from which any driven shaft as the wheel shaft of a motor vehicle may be driven by means of sprocket chains, not shown. The driving shaft also carries a drum 73 which is provided with grooves, see dotted lines Fig. 3, to receive straps 74 and 75, which are adapted to alternately grip and release the drum. Each of the driving eccentric straps is made in two parts as usual, one part of each strap comprising a body 76 from which an arm 77 extends. At the outer end of each arm is a yoke 78 which is pivoted, as at 81, to an arm 79 extending from one of the straps which inclose drum 73; for example, strap 74. The arms 79 extend from the ends of the drum straps farthest from the eccentrics. The other end of each drum strap is provided with an arm 80. The inner faces of these arms lie parallel. The outer face of each arm 80 is an arc of a circle of which the pivot 81 of the yoke to arm 79 is the center. 82 denotes shoes lying between the arms of the yokes 78, the inner faces of which are curved to correspond with the curved outer faces of arms 80. 83 denotes rods, one end of each rod being connected to one of the shoes 82 and extending through one of the arms 77 which is so shaped as to permit the rod to extend through it in a longitudinally oblique direction, thimbles 84, which may be integral with the yokes, being preferably provided in the arms as bearings for the rods.

At the opposite ends of the rods are straps 85 which inclose eccentrics 86 lying in sockets 87 in bodies 76. Each rod is preferably made in two parts and is provided with an adjusting device 88 which enables the maker in assembling the machine to lengthen or shorten the rods slightly as may be required to produce the desired results. Each eccentric is eccentrically secured to a shaft 89, the ends of which are journaled in the bodies 76 on opposite sides of sockets 87. Each end of these shafts extends outward from the side of the body and has secured at one end a dog 90 and at the other end a dog 91. These dogs extend in opposite directions and are adapted to engage the raised and depressed surfaces on eccentrics 28 and 29 by which they are caused to oscillate eccentrics 86 whereby the drum straps are caused to alternately grip and release the drum on the driving shaft to either drive it forward or backward or hold it stationary as may be required.

Figure 5:
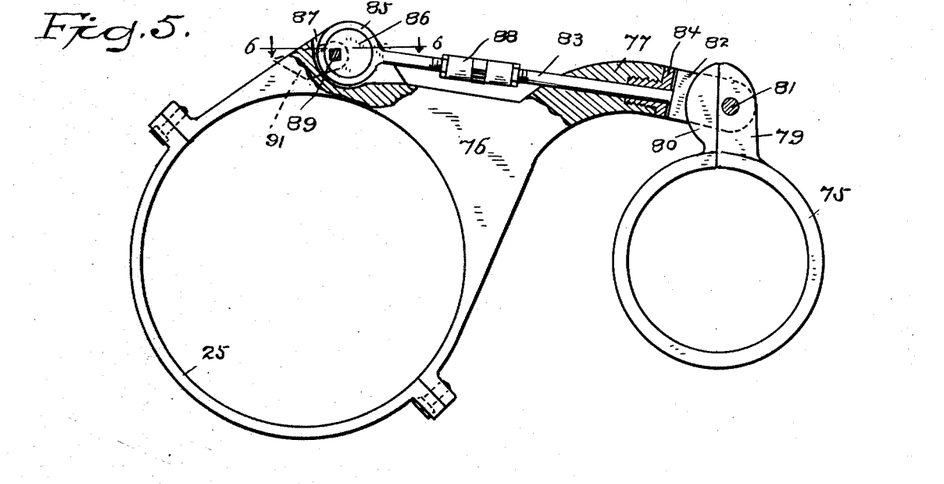
Fig. 5 a detail elevation partly in section, of one of the eccentric straps, the corresponding drum strap and the clutch mechanism detached, the position of the parts corresponding with Figs. 1 and 4.
Figure 6:
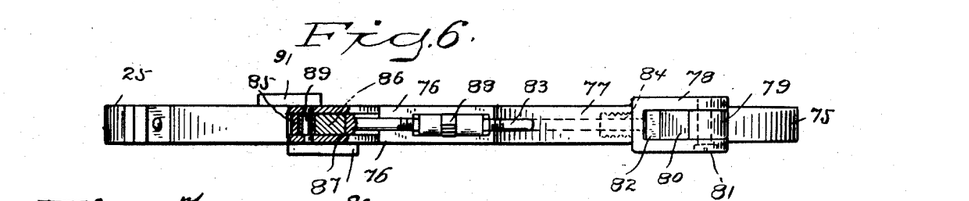
Fig. 6 a plan view corresponding therewith, partly in section on the line 6—6 in Fig. 5.
Figure 7:
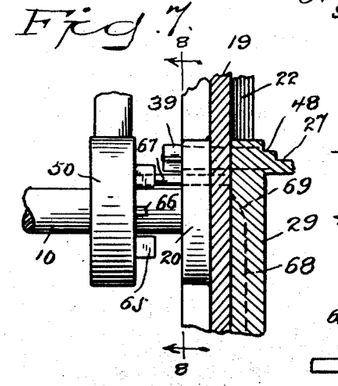
Fig. 7 a detail sectional view illustrating the operation of one of the sliding pins that move the sliding collars outward on the driving shaft and place the lugs thereon out of engagement with the corresponding star wheel.

The operation is as follows: For convenience in description, eccentrics 28 and 29 will be spoken of as the driving eccentrics, and eccentrics 86 will be spoken of as the gripping eccentrics. When the driving eccentrics are in the position shown in Fig. 1, that is drawn inward to their inoperative position, it is obvious that their rotation with the disks will cause no throw of the eccentric straps, bodies 76 and arms 77, so that no movement will be imparted to the driving shaft. The gripping operation upon the driving shaft will continue as before and is now a braking operation, as each of the drum straps will alternately grip and release the drum upon the driving shaft. This alternate gripping and releasing of the driving shaft is effected through the operation of the gripping eccentrics, which in turn are actuated by the driving eccentrics, it being understood of course that it is contemplated to regulate the speed, stop or reverse without any interference whatever with the engine. Understanding therefore that the rotation of the driving eccentrics is always the same without regard to their throw, it will be obvious that their action upon the gripping eccentrics is always the same. The raised surfaces of the driving eccentrics are shown as extending approximately one-third around their peripheries although this is immaterial as the same result would be produced by pins or protuberances on the peripheries of the driving eccentrics, as when the gripping eccentrics are once actuated they must remain in the position in which they are placed until actuated in the opposite direction. I preferably, however, as shown in the drawings, make the raised surfaces long enough so that each dog will rest on a raised surface most of the time that the co-acting dog is resting on a depressed surface. The effect therefore of each rotation of a driving eccentric is to oscillate the dogs connected to the corresponding gripping eccentric in each direction, one of the movements causing the drum strap to grip the drum and retain it gripped until the other movement takes place, which causes the drum strap to release the drum and leave it released until it is again gripped during the next rotation of the driving eccentric. The gripping movement is caused by the action of a shoe 82 upon the corresponding curved face of an arm 80, and is wholly independent of the throw of the corresponding driving eccentric. The gripping operation when there is no throw of the driving eccentrics will be readily understood from Figs. 1 and 4 in connection with Figs. 5 and 6, which show eccentric 29, eccentric strap 25 and drum strap 75. As the dogs 90 and 91 and the corresponding shaft 89 and gripping eccentric 86 are rigidly secured together and move as one piece and as the disks and driving eccentrics rotate from right to left, as indicated by arrows in Figs. 3 and 4, it follows that when dog 90 rides up one of the inclines 30 of a raised peripheral surface, for example surface 45 of driving eccentric 29, and dog 91 rides down another incline 30 and upon depressed peripheral surface 47 of said eccentric, that the corresponding gripping eccentric 86 will be oscillated within strap 85 and the shaft 89, which is the center of oscillation of the eccentric, will be moved downward in an arc and in the direction of the drum on the driving shaft. In other words, the greater diameter of the said gripping eccentric will be oscillated backward and will draw rod 83 and shoe 82 backward away from arm 80 on drum strap 75 and will relieve the pressure of the shoe on said arm and consequently relieve the grip of said drum strap on the drum, so that the drum may rotate freely within the strap or the strap may be oscillated upon the drum. When dog 91 rides up one of the inclines 30 of raised peripheral surface 46 of eccentric 29, and dog 90 rides down another incline 30 and upon depressed peripheral surface 48 of said eccentric, the corresponding gripping eccentric 86 will be again oscillated within strap 85 and the shaft 89 will be moved upward in an arc and the greater diameter of said eccentric will be oscillated forward and will force rod 83 and shoe 82 forward, forcing arm 80 on drum strap 75 forward, which will cause said drum strap to grip the drum tightly and hold it until released by the movement last previously described. In other words, drum straps 74 and 75 are caused through the action of the raised and depressed peripheral surfaces on the driving eccentrics, and gripping eccentrics 86 and the intermediate connections, to each alternately grip and release the drum, the parts being so timed and proportioned that one drum strap will release the drum at the instant the other drum strap grips it and vice versa, so that the driving shaft is at all times under the control of the gripping and releasing mechanism.

In reversing, that is when the driving shaft is being turned backward, as in the direction of the arrow in Fig. 3, the gripping movement will take place when the driving eccentrics are at the extreme of their throw toward the left as seen in said figure, and will continue until they are at the extreme of their throw toward the right, at which instant the release takes place. In Fig. 3, driving eccentric 29 and the intermediate connections just described are about to cause drum strap 75 to release the drum, and driving eccentric 28 and the intermediate connections are about to cause drum strap 74 to grip the drum. The reversing movement of the driving shaft is imparted thereto by the rotary pressure toward the right exerted thereon by the driving eccentrics, drum straps and intermediate connections. The speed at which the driving shaft is rotated obviously depends upon the length of time pressure is exerted upon it which is determined by the throw of the eccentrics. In Fig. 3, as already stated, the eccentrics are at the extreme of their movement outward and are imparting to the driving shaft the greatest possible reverse movement.

Figure 1:
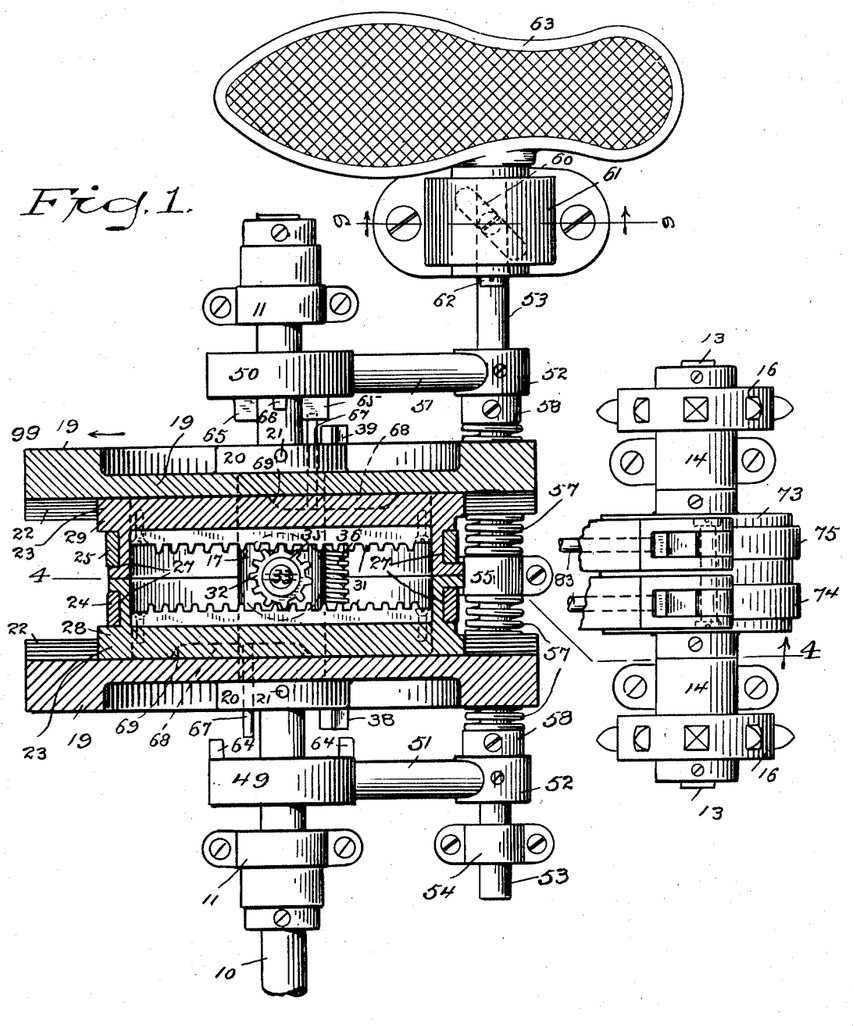
Figure 1 is a plan view of my novel speed regulating mechanism complete, the eccentrics being in section on the line 1—1 in Fig. 4 and shown at rest, that is in the inoperative position, so that no movement is imparted to the driving shaft.

As already explained, the operating lever, in the present instance a foot lever, is returned to its normal position by springs 57 the instant pressure thereon is relieved, which returns the longitudinally movable rod 53 carrying sliding collars 49 and 50 to its normal position, as clearly shown in Fig. 1, in which position none of the lugs on either of the sliding collars can be engaged by the star wheels to operate the worm shaft and worm and throw the eccentrics outward. In starting, the operator presses downward upon the toe end of the foot lever which moves the eccentrics from the position shown in Fig. 1 toward the position shown in Fig. 2. Continued pressure upon the foot lever would continue the engagement of star wheel 38 with the lugs 64 on sliding collar 49, the effect of which would be to move the eccentrics outward to their farthest throw and give full speed to the driving shaft. When the eccentrics are in this position, further engagement of the star wheel with the lugs 64 is stopped through the action of one of the sliding pins 67 which rides up one of the inclines 69 of the corresponding groove 68, forcing said pin outward and forcing sliding collar 49 outward on the driving shaft carrying lugs 64 out of the engaging position. To reduce the speed, the operator would press downward upon the heel end of the foot lever, the effect of which would be to move the eccentrics from the position shown in Fig. 2 toward the position shown in Fig. 1. The heel pressure upon the foot lever would require to be but slight and to last for an instant only—just sufficient time to cause the lugs 65 on sliding collar 50, which would be moved into the engaging position, to be engaged by star wheel 39 for an instant to impart the necessary inward movement to the eccentrics to reduce the speed as desired. Should the heel pressure upon the foot lever be continued, sliding collar 50 will be moved backward and the lugs 65 carried out of the engaging position by one of the sliding pins 67 in the manner described. Should it be required to stop the speed of the driving shaft very quickly and apply reverse movement thereto, the heel end of the foot lever would be pressed down hard, which would place lugs 66 on sliding collar 50, as well as lugs 65, in position to be engaged by the star wheel and would cause the star wheel to be actuated four times instead of twice during each rotation of the eccentrics and would consequently throw the eccentrics to the reversing position very quickly.

The action of the gripping mechanism in turning the driving shaft forward is just the reverse of the gripping operation in reversing, which has already been fully described. Fig. 2 shows the position of the eccentrics when driving but does not show the gripping mechanism. Fig. 3 shows the position of the eccentrics in reversing and also shows the gripping mechanism in full. In driving, that is when the driving shaft is being turned forward, in the opposite direction from the arrow in Fig. 3, the gripping movement will take place when the driving eccentrics are at the extreme of their throw toward the right, as seen in said figure, and will continue until they are at the extreme of their throw toward the left, at which instant the release takes place. As seen in Fig. 3, if the driving shaft was being turned forward, driving eccentric 28 and the intermediate connections would be causing drum strap 74 to grip the drum and about to release it, and driving eccentric 29 and the intermediate connections would be holding drum strap 75 released and about to grip the drum.

Having thus described my invention I claim:

1. In a device of the character described the combination with a power shaft having an enlargement with a transverse recess, a shaft passing through said enlargement and carrying a worm wheel lying in the recess and pinions, of carrying disks on said shaft, eccentrics adapted to slide transversely on said disks and having racks on their inner faces which are engaged by the pinions, a worm engaging the worm wheel whereby the latter may be rotated to move the eccentrics oppositely in either direction, a driving shaft, and connections between said eccentrics and driving shaft for rotating the latter substantially as described, for the purpose specified.

2. In a device of the character described the combination with a power shaft having an enlargement with a transverse recess, a shaft carrying pinions and having a worm wheel lying in said recess, of carrying disks on the power shaft, eccentrics adapted to slide transversely on said disks and provided with racks engaged by the pinions, a shaft carrying a worm engaging the worm wheel and having star wheels at its ends, means for actuating either star wheel, whereby the eccentrics may be moved oppositely in either direction, a driving shaft, and connections between said eccentrics and driving shaft for rotating the latter.

3. In a device of the character described the combination with a power shaft, carrying disks thereon, eccentrics adapted to slide transversely on said disks, a worm shaft journaled in the disks and having star wheels at its ends and connecting mechanism intermediate the worm shaft and the eccentrics whereby the latter may be moved oppositely in either direction, of sliding collars on the power shaft having lugs adapted to be engaged by the respective star wheels, means for moving either of said sliding collars into operative position, a driving shaft, and connections between said eccentrics and driving shaft for rotating the latter.

4. In a device of the character described the combination with a power shaft, carrying disks thereon, eccentrics adapted to slide transversely on said disks, a worm shaft journaled in the disks and having star wheels at its ends and connecting mechanism intermediate the worm shaft and the eccentrics whereby the latter may be moved oppositely in either direction, of sliding collars on the power shaft having lugs adapted to be engaged by the respective star wheels, means for moving either of said sliding collars into a position that will cause the lugs thereon to be engaged by the corresponding star wheel, springs for returning the sliding collars to their normal position the instant the moving power is relieved, a driving shaft, and connections between said eccentrics and driving shaft for rotating the latter.

5. In a device of the character described the combination with a power shaft, carrying disks thereon, eccentrics adapted to slide transversely on said disks, a worm shaft journaled in the disks and having star wheels at its ends and connecting mechanism intermediate the worm shaft and the eccentrics whereby the latter may be moved oppositely in either direction, of sliding collars on the power shaft having lugs adapted to be engaged by the respective star wheels, a longitudinally movable rod to which the sliding collars are connected, springs for retaining said rod and the sliding collars at the inoperative position, means for moving said rod longitudinally to place either sliding collar in the operative position, a driving shaft, and connections between said eccentrics and driving shaft for rotating the latter.

6. In a device of the character described the combination with a power shaft, carrying disks thereon, eccentrics adapted to slide transversely on said disks, a worm shaft journaled in the disks and having star wheels at its ends and connecting mechanism intermediate the worm shaft and the eccentrics whereby the latter may be moved oppositely in either direction, of sliding collars on the power shaft having lugs adapted to be engaged by the respective star wheels, a longitudinally movable rod to which the sliding collars are connected, a roller journaled on a pin extending from said rod, springs for retaining said rod and the collars at the inoperative position, a cam having a slot engaged by said roller, a rock shaft by which the cam is oscillated to move the rod longitudinally, a driving shaft, and connections between said eccentrics and driving shaft for rotating the latter.

7. In a device of the character described the combination with a power shaft, carrying disks thereon, eccentrics adapted to slide transversely on said disks, a worm shaft journaled in the disks and having star wheels at its ends and connecting mechanism intermediate the worm shaft and the eccentrics whereby the latter may be moved oppositely in either direction, of sliding collars on the power shaft having lugs adapted to be engaged by the respective star wheels, a longitudinally movable rod to which the sliding collars are connected, a roller journaled on a pin extending from said rod, springs for retaining said rod and collars at the inoperative position, a cam having a slot engaged by said roller, a rock shaft to which the cam is connected, a foot lever by which the rock shaft and cam are oscillated to rotate the worm shaft and move the eccentrics, a driving shaft, and connections between said eccentrics and driving shaft for rotating the latter.

8. In a device of the character described the combination with a power shaft, carrying disks thereon, eccentrics adapted to slide transversely on said disks, a worm shaft journaled in the disks and having star wheels at its ends and connecting mechanism intermediate the worm shaft and the eccentrics whereby the latter may be moved oppositely in either direction, of sliding collars on the power shaft having lugs adapted to be engaged by the respective star wheels, arms extending from said collars and having collars 52 at their opposite ends, a longitudinally movable rod to which collars 52 are connected, adjustable collars on said rod, a standard 55 in which said rod slides, springs bearing against the adjustable collars and the standard to retain the rod in its normal position, means for moving said rod longitudinally against the power of the springs, a driving shaft, and connections between said eccentrics and driving shaft for rotating the latter.

9. In a device of the character described the combination with the power shaft, carrying disks, eccentrics, worm shaft and star wheels, of a sliding collar on the power shaft having lugs adapted to be engaged by one of the star wheels on the outer side thereof, a sliding collar on the power shaft having lugs adapted to be engaged by the other star wheel on the inner side thereof, means for moving either of said collars into operative position, a driving shaft, and connections between said eccentrics and driving shaft for rotating the latter.

10. In a device of the character described the combination with the power shaft, carrying disks, eccentrics, worm shaft and star wheels, of a sliding collar on the power shaft having lugs adapted to be engaged by one of the star wheels to move the eccentrics oppositely, a sliding collar having lugs adapted to be engaged by the other star wheel to reverse the movement of the eccentrics, a foot lever and intermediate connections for moving either of said collars into operative position, a driving shaft, and connections between said eccentrics and driving shaft for rotating the latter.

11. In a device of the character described the combination with the power shaft, carrying disks, eccentrics, worm shaft and star wheels, of a driving shaft, connections intermediate the eccentrics and the driving shaft for imparting rotation thereto in either direction, a sliding collar on the power shaft having lugs adapted to be engaged by one of the star wheels to move the eccentrics outward oppositely to increase their throw and the speed of the driving shaft and a sliding collar on the power shaft having lugs adapted to be engaged by the other star wheel to move the eccentrics in the opposite direction and decrease their throw and the speed of the driving shaft and to reverse the driving shaft.

12. In a device of the character described the combination with the power shaft, carrying disks, eccentrics, worm shaft and star wheels, of a driving shaft, connections intermediate the eccentrics and the driving shaft, for the purpose set forth, a sliding collar on the power shaft having lugs adapted to be engaged by one of the star wheels to move the eccentrics oppositely to decrease their throw and the speed of the driving shaft and to reverse the driving shaft, and shorter intermediate lugs on said collar which are adapted to be engaged by said star wheel to double the actuations thereof in an emergency.

13. In a device of the character described the combination with the power shaft, carrying disks thereon, eccentrics adapted to slide oppositely on the carrying disks and having grooves in their outer faces with inclines at their ends, a worm shaft journaled in the disks and having star wheels at its ends and connections intermediate said worm shaft and the eccentrics for moving the eccentrics oppositely in either direction, of sliding collars on the power shaft having lugs adapted to be engaged by the respective star wheels to actuate the worm shaft in either direction, sliding pins in the carrying disks whose inner ends are adapted to ride up the inclines of the grooves and whose outer ends are adapted to engage the sliding collars respectively to move them outward on the power shaft and place the lugs thereon out of engaging position when the eccentrics are moved outward in either direction to the extreme of their throw, a driving shaft, and connections between said eccentrics and driving shaft for rotating the latter.

14. In a device of the character described the combination with the power shaft, carrying disks and eccentrics adapted to slide transversely thereon and having grooves in their outer faces with inclines at their ends, a worm shaft and connections for actuating the eccentrics and star wheels on the worm shaft, of sliding collars on the power shaft having lugs adapted to be engaged by the respective star wheels, for the purpose set forth, sliding pins in the carrying disks whose ends are adapted to ride up the inclines of the grooves and whose outer ends are adapted to engage the sliding collars respectively, a driving shaft, and connections between said eccentrics and driving shaft for rotating the latter, substantially as described, for the purpose specified.

15. In a device of the character described the combination with the driving shaft, driving eccentrics, eccentric straps and arms 77, of a driving shaft having a drum, straps inclosing said drum and having arms extending therefrom to one of which each arm 77 is pivoted, and mechanism actuated by the eccentrics for causing the drum straps to alternately grip and release the drum.

16. In a device of the character described the combination with the driving eccentrics, eccentric straps and arms 77, of a driving shaft, a drum thereon, straps inclosing said drum and having arms extending therefrom to one of which each arm 77 is pivoted, rods carrying shoes bearing against the other arms extending from the drum straps, gripping eccentrics, straps carried by the rods and inclosing the gripping eccentrics and means for oscillating the gripping eccentrics whereby the drum straps are caused to alternately grip and release the drum.

17. In a device of the character described the combination with the driving eccentrics, eccentric straps having bodies and arms 77 extending therefrom, a driving shaft and a drum thereon, of straps inclosing said drum and having arms extending therefrom to one of which each arm 77 is pivoted, rods carrying shoes bearing against the other drum strap arms, gripping eccentrics carried by the bodies, straps carried by the rods and inclosing said gripping eccentrics and means for oscillating the gripping eccentrics, substantially as described for the purpose specified.

18. In a device of the character described the combination with the driving eccentrics having raised and depressed peripheral surfaces, eccentric straps having bodies and arms 77 extending therefrom, a driving shaft and a drum thereon, of straps inclosing said drum and having arms extending therefrom to one of which each arm 77 is pivoted, rods carrying shoes bearing against the other drum strap arms, gripping eccentrics carried by the bodies, straps carried by the rods and inclosing the gripping eccentrics and dogs connected to the gripping eccentrics and adapted to engage the raised and depressed surfaces on the driving eccentrics whereby the gripping eccentrics are oscillated, substantially as described, for the purpose specified.

19. The combination with the disks, oppositely movable eccentrics carried thereby and provided with raised and depressed peripheral surfaces and straps having arms 77 extending therefrom, of a drum, straps inclosing said drum and having arms extending therefrom to one of which each arm 77 is pivoted, rods carrying shoes bearing against the other drum strap arms and means for actuating the shoes whereby the drum straps are caused to alternately grip and release the drum.

20. The combination with the disks, oppositely movable driving eccentrics carried thereby and provided with raised and depressed peripheral surfaces and straps having arms 77 extending therefrom, of a drum, straps inclosing said drum and having arms extending therefrom to one of which each arm 77 is pivoted, rods carrying shoes bearing against the other drum strap arms, straps at the other ends of said rods, gripping eccentrics inclosed by said straps and means for oscillating said eccentrics, substantially as described, for the purpose specified.

21. The combination with the disks, oppositely movable driving eccentrics carried thereby and provided with raised and depressed peripheral surfaces and straps having arms 77 extending therefrom, of a drum, straps inclosing said drum and having arms extending therefrom to one of which each arm 77 is pivoted, rods carrying shoes bearing against the other drum strap arms, straps at the other ends of said rods, gripping eccentrics inclosed by said straps, and dogs rigidly secured to the gripping eccentrics and bearing upon the peripheral surfaces of the driving eccentrics, whereby the gripping eccentrics are oscillated, substantially as described, for the purpose specified.

22. The combination with the disks, oppositely movable driving eccentrics carried thereby and provided with raised and depressed peripheral surfaces and straps having arms 77 extending therefrom, of a drum, straps inclosing said drum and having arms 79 to which arms 77 are pivoted, and arms 80 whose outer faces are arcs of circles of which the pivotal points of arms 77 to arms 79 are the centers, rods carrying shoes bearing against the curved outer faces of arms 80, straps at the other ends of said rods, gripping eccentrics inclosed by said straps and means for oscillating the gripping eccentrics, substantially as described, for the purpose specified.

23. The combination with the disks, oppositely movable driving eccentrics carried thereby and provided with raised and depressed peripheral surfaces and straps having arms 77 extending therefrom, of a drum, straps inclosing said drum and having arms extending therefrom to one of which each arm 77 is pivoted, rods carrying shoes bearing against the other drum strap arms and extending through arms 77 in a longitudinally oblique direction, straps at the other ends of said rods and gripping eccentrics inclosed by said straps and having dogs rigidly secured thereto which engage the peripheral surfaces of the driving disks.

24. The combination with the disks, oppositely movable driving eccentrics carried thereby and provided with raised and depressed peripheral surfaces and straps having arms 77 extending therefrom, of a drum, straps inclosing said drum and having arms extending therefrom to one of which each arm 77 is pivoted, two-part rods carrying shoes bearing against the other drum strap arms, adjusting devices on said rods, straps at the other ends of said rods, gripping eccentrics inclosed by said straps and means for oscillating the gripping eccentrics.

25. The combination with the disks, oppositely movable driving eccentrics carried thereby and provided with raised and depressed peripheral surfaces, straps inclosing said eccentrics and having bodies 76 and arms 77 extending therefrom, of a drum, straps inclosing said drum and having arms extending therefrom to one of which each arm 77 is pivoted, rods carrying shoes bearing against the other drum strap arms, straps at the other ends of said rods, gripping eccentrics carried by the bodies and inclosed by said strips, shafts to which said eccentrics are rigidly secured and dogs rigidly secured to said shafts and bearing on the peripheral surfaces of the driving eccentrics whereby the gripping eccentrics are operated.

26. The combination with the disks, oppositely movable driving eccentrics carried thereby and provided with raised and depressed peripheral surfaces merging into each other by means of inclines, and straps having arms 77 extending therefrom, of a drum, straps inclosing said drum and having arms extending therefrom to one of which each arm 77 is pivoted, rods carrying shoes bearing against the other drum strap arms, straps at the other ends of said rods, gripping eccentrics inclosed by said straps and dogs carried by the gripping eccentrics and actuated by the inclines on the driving eccentrics to oscillate the gripping eccentrics, substantially as described, for the purpose specified.

27. The combination with the disks, oppositely movable driving eccentrics carried thereby and provided with grooves and raised and depressed peripheral surfaces on opposite sides thereof, each raised surface lying opposite to a depressed surface and straps in said grooves having arms 77 extending therefrom, of a drum, straps inclosing said drum and having arms extending therefrom to one of which each arm 77 is pivoted, and means for actuating the other drum strap arms to cause the drum straps to alternately grip and release the drum.

28. The combination with the two separate disks and driving eccentrics carried thereby, of a drum, straps inclosing said drum, connections intermediate the drum straps and the driving eccentrics whereby the former are caused to alternately grip and release the drum, and means for oppositely adjusting the eccentrics on their respective disks so as to rotate the drum in either direction.

29. The combination with the disks, oppositely movable eccentrics carried thereby and eccentric straps having arms 77 extending therefrom, of a drum, straps inclosing said drum, arms 79 extending from said straps to which arms 77 are pivoted, arms 80 extending from said straps and having outer faces curved in an arc of a circle of which the pivotal point of arms 77 to arms 79 is the center, shoes bearing on said curved outer faces, and means actuated by the driving eccentrics for causing the shoes to bear on arms 80 and clamp the eccentric straps about the drum.

30. The combination with the disks, oppositely movable eccentrics carried thereby, a worm shaft journaled in the disks, actuating mechanism therefor, connecting mechanism intermediate the worm shaft and the eccentrics and eccentric straps having arms 77 extending therefrom, of a drum, straps inclosing said drum and having arms extending therefrom to one of which each arm 77 is pivoted, and means actuated by the eccentrics for causing the drum straps to alternately grip and release the drum.

31. In a device of the character described the combination with a power shaft, carrying disks thereon, eccentrics adapted to slide transversely on said disks, a worm shaft journaled in the disks and having star wheels at its ends and connecting mechanism intermediate the worm shaft and the eccentrics whereby the latter may be moved oppositely in either direction, of sliding collars on the power shaft having lugs adapted to be engaged by the respective star wheels, arms extending from said collars, a longitudinally movable rod to which said arms are connected, adjustable collars on said rod, springs bearing against said collars to retain the rod in its normal position, a driving shaft, and connections between said eccentrics and driving shaft for rotating the latter.

32. The combination with the disks, oppositely movable eccentrics carried thereby, a worm shaft journaled in the disks and having star wheels at its ends, connecting mechanism intermediate the worm shaft and the eccentrics and sliding collars having lugs by which the star wheels are actuated, of eccentric straps having arms 77 extending therefrom, a drum, straps inclosing said drum and having arms extending therefrom to one of which each arm 77 is pivoted, and means actuated by the eccentrics for causing the drum straps to alternately grip and release the drum.

33 The combination with the disks, oppositely movable eccentrics carried thereby and having grooves in their outer faces, a worm shaft having star wheels at its ends by which the eccentrics are adjusted oppositely, for the purpose set forth, sliding collars having lugs by which the star wheels are actuated and sliding pins in the disks which engage the inclines in the eccentrics to move the sliding collars out of the engaging position at the extreme of the throw of the eccentrics, of eccentric straps having arms 77 extending therefrom, a drum, straps inclosing said drum and having arms extending therefrom to one of which each arm 77 is pivoted, and means actuated by the eccentrics for causing the drum straps to alternately grip and release the drum.

34. The combination with the disks, oppositely movable eccentrics carried thereby and provided with raised and depressed peripheral surfaces, eccentric straps and arms 77 extending therefrom and having yokes at their forward ends, of a drum, drum straps having arms extending therefrom to one of which each yoke is pivoted, rods carrying shoes bearing against the other drum strap arm and means for actuating said rods to cause the strap to grip and release the drum.

35. The combination with the disks, driving eccentrics carried thereby, a worm shaft journaled in the disks and having star wheels at its ends and connecting mechanism intermediate the worm shaft and the eccentrics, for the purpose set forth, of sliding collars on the power shaft, said collars being provided with lugs adapted to be oppositely engaged by the respective star wheels to rotate the worm shaft in either direction, a driving shaft, and connections between said eccentrics and driving shaft for rotating the latter.

36. The combination with the disks, driving eccentrics carried thereby, a worm shaft journaled in the disks and having star wheels at its ends and connecting mechanism intermediate the worm shaft and the eccentrics, for the purpose set forth, of a sliding collar on the power shaft having lugs adapted to be engaged on the outer side by one of the star wheels, a sliding collar having lugs adapted to be engaged on the inner side by the other star wheel, a driving shaft, and connections between said eccentrics and driving shaft for rotating the latter, substantially as described, for the purpose specified.

37. The combination with the disks and driving eccentrics carried thereby, of a drum, straps inclosing said drum, connections intermediate the driving eccentrics and the drum straps whereby the latter are caused to alternately grip and release the drum and a foot lever and intermediate connections whereby the eccentrics may be moved oppositely on the disks to change the speed or reverse or brake the drum.

38. The combination with the power shaft, carrying disks and driving eccentrics, of a driving shaft, a drum thereon, straps inclosing said drum, connections intermediate the driving eccentrics and the drum straps whereby the latter are caused to alternately directly grip and release the drum and a foot lever and intermediate connections whereby the eccentrics may be moved oppositely on the disks to change the speed or reverse or brake the power shaft.

39. The combination with the power shaft, carrying disks, driving eccentrics provided with raised and depressed peripheral surfaces and straps having arms 77 extending therefrom, of a driving shaft, a drum thereon, straps inclosing said drum and having arms extending therefrom to one of which each arm 77 is pivoted, rods carrying shoes bearing against the other drum strap arms, straps at the other ends of said rods, gripping eccentrics inclosed by said straps, connections intermediate the driving eccentrics and the gripping eccentrics whereby the latter are oscillated and a foot lever and intermediate connections whereby the driving eccentrics may be moved on the disks to change the speed or brake or reverse the power shaft.

40. In a device of the character described the combination with adjustable driving eccentrics, of a drum, straps inclosing and fitting said drum, connections intermediate said straps and the eccentrics whereby the straps are caused to alternately directly grip and release the drum and a rock shaft and intermediate connections whereby the eccentrics may be adjusted to increase or diminish the speed or reverse or brake the drum.

41. The combination with adjustable driving eccentrics provided with raised and depressed peripheral surfaces and straps having arms 77 extending therefrom, of a drum, straps inclosing said drum, gripping eccentrics and connections whereby said straps are caused to alternately grip and release the drum, and connections intermediate the driving eccentrics and the gripping eccentrics whereby the latter are oscillated.

42. The combination with adjustable driving eccentrics provided with raised and depressed peripheral surfaces, and straps having arms 77 extending therefrom, of a drum, straps inclosing said drum, gripping eccentrics, connections intermediate the gripping eccentrics and the drum straps whereby the latter are caused to alternately grip and release the drum and dogs carried by the gripping eccentrics and engaging the peripheral surfaces of the driving eccentrics to oscillate the gripping eccentrics.

In testimony whereof I affix my signature, in presence of two witnesses.

FRANK C. CRAW.

Witnesses:
A. M. WOOSTER,
S. W. ATHERTON.